United States Patent
Dandekar et al.

(10) Patent No.: US 8,870,224 B2
(45) Date of Patent: Oct. 28, 2014

(54) ENGINE CRADLE WITH DEFLECTOR DEVICE

(71) Applicants: Bhushan W Dandekar, Rochester Hills, MI (US); Mohammed N Shaik, Canton, MI (US); Young Doe, Macomb, MI (US); Bradley W Enyeart, Milford, MI (US); Michael L Stockard, Oxford, MI (US); Len V Peschansky, West Bloomfield, MI (US); Yunjun Li, West Bloomfield, MI (US)

(72) Inventors: Bhushan W Dandekar, Rochester Hills, MI (US); Mohammed N Shaik, Canton, MI (US); Young Doe, Macomb, MI (US); Bradley W Enyeart, Milford, MI (US); Michael L Stockard, Oxford, MI (US); Len V Peschansky, West Bloomfield, MI (US); Yunjun Li, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 13/736,977

(22) Filed: Jan. 9, 2013

(65) Prior Publication Data

US 2014/0191105 A1    Jul. 10, 2014

(51) Int. Cl.
*B62D 7/22*    (2006.01)
*B60K 5/12*    (2006.01)

(52) U.S. Cl.
CPC .................................... *B60K 5/12* (2013.01)

USPC .......................................................... 280/784

(58) Field of Classification Search
USPC .................. 280/784, 854; 293/114, 118, 150
See application file for complete search history.

(56) References Cited

U.S. PATENT DOCUMENTS

| 4,240,517 | A | * | 12/1980 | Harlow et al. | 180/295 |
| 4,263,980 | A | * | 4/1981 | Harlow et al. | 180/292 |
| 5,611,568 | A | * | 3/1997 | Masuda | 280/784 |
| 6,076,625 | A | * | 6/2000 | Matt et al. | 180/312 |
| 6,460,889 | B2 | * | 10/2002 | Iyanagi et al. | 280/784 |
| 7,810,437 | B2 | * | 10/2010 | Mattschull | 105/392.5 |
| 7,854,454 | B2 | * | 12/2010 | Yang et al. | 293/155 |
| 7,926,847 | B2 | * | 4/2011 | Auer et al. | 280/784 |
| 8,480,130 | B2 | * | 7/2013 | Dandekar et al. | 280/784 |

* cited by examiner

*Primary Examiner* — John Walters
*Assistant Examiner* — James Triggs

(57) ABSTRACT

A cradle for mounting an engine in a vehicle has left and right side members, and a rear cross member and front cross member extending between the left and right side members. The cradle has left and right front body mounts. Left and right deflector devices are mounted respectively on the cradle adjacent the left and right body mounts and forwardly of the vehicle wheels. Each of the left and right deflector devices including an impact receiving member that projects outwardly and rearwardly from the cradle to receive an impact load offset outboard from the body mounts. Each impact receiving member has an upper and lower sheet metal shell providing a top wall welded to a top wall of the cradle and a bottom wall welded to the bottom wall of the cradle, and a front impact receiving wall extending vertically between the top wall and the bottom wall.

20 Claims, 3 Drawing Sheets

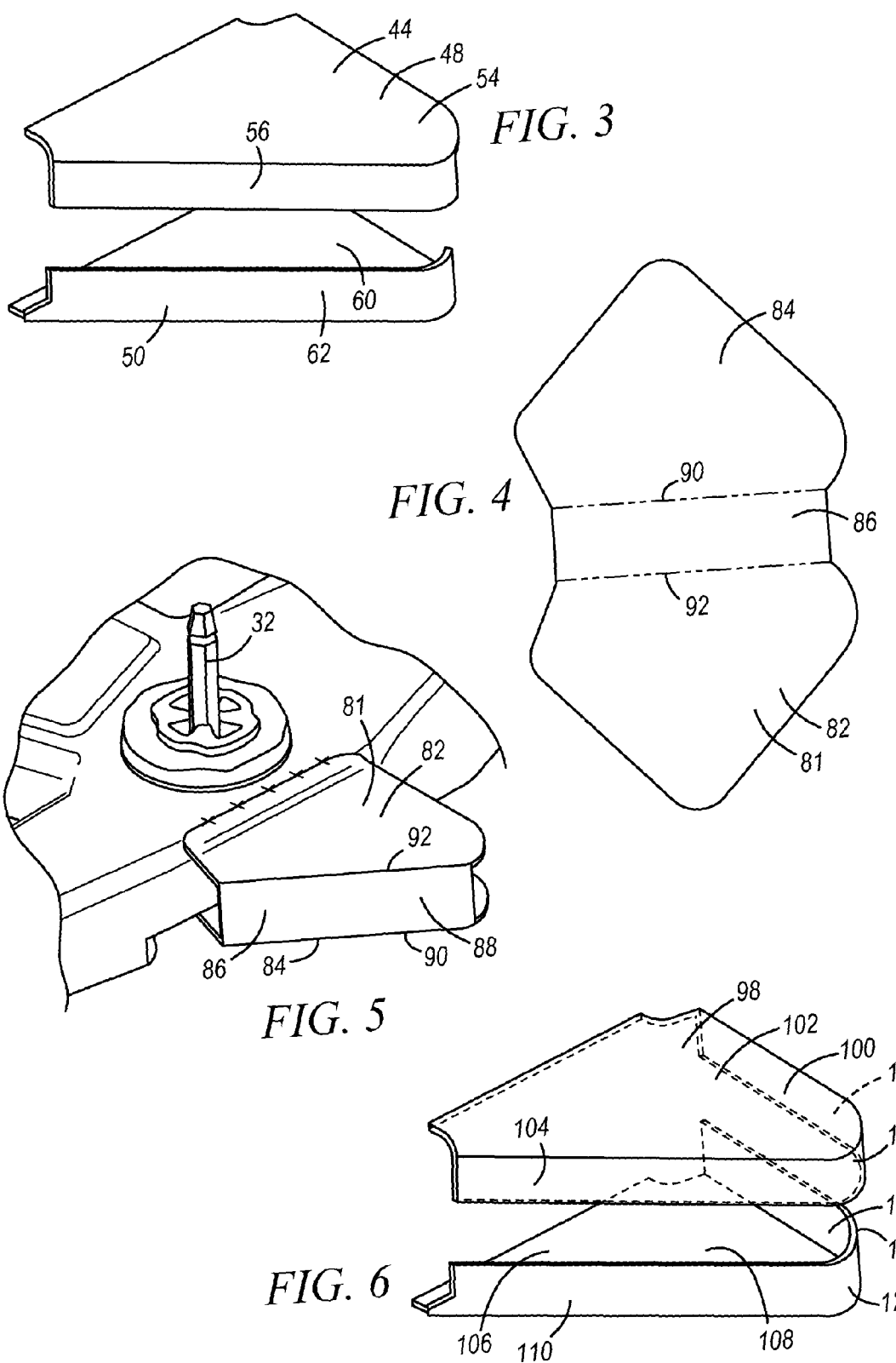

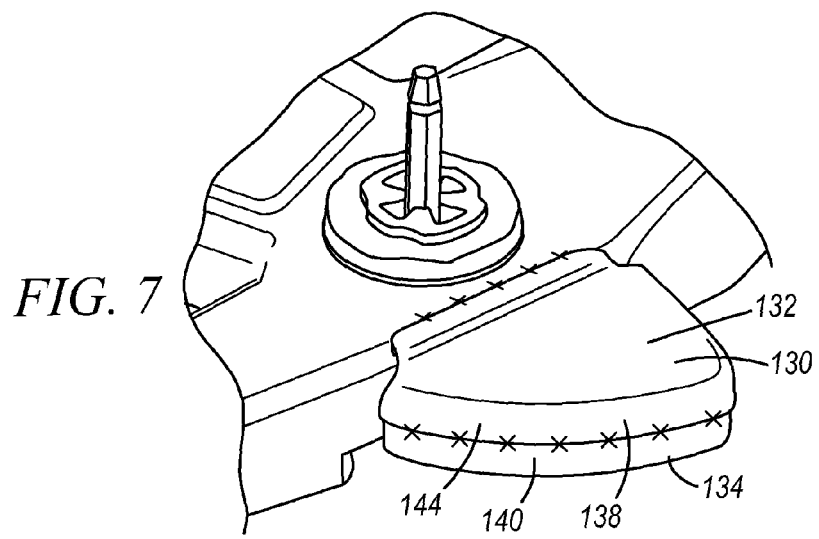
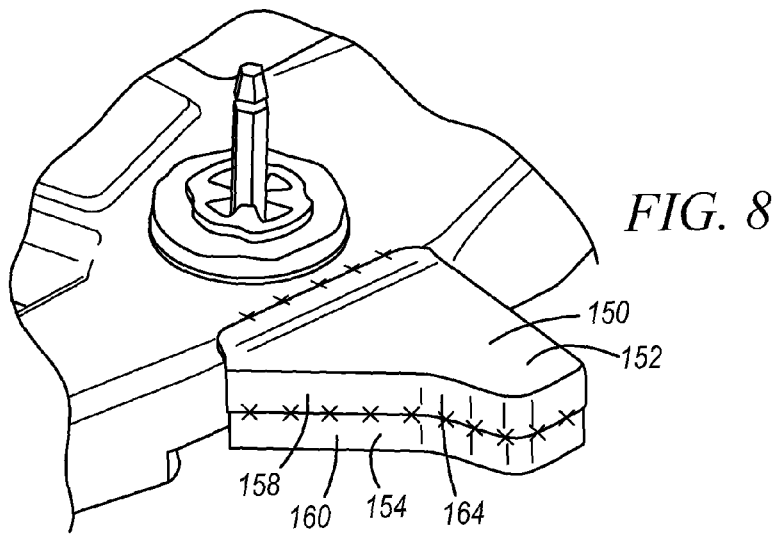
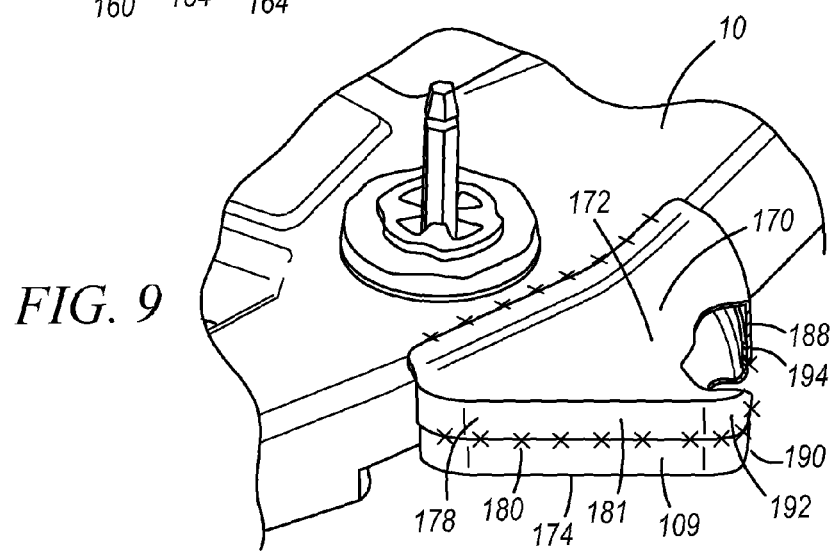

US 8,870,224 B2

ENGINE CRADLE WITH DEFLECTOR DEVICE

FIELD OF THE INVENTION

The present invention relates to an engine cradle for a motor vehicle and more particularly relates to a deflector device that transfers an impact load into the engine cradle.

BACKGROUND OF THE INVENTION

Some motor vehicles are built on a full frame that includes left and right frame rails connected by cross members so as to form a ladder-like frame structure. In this type of construction, the frame and the vehicle body are constructed seperately, and each is a complete unit by itself. The left and right frame rails run the length of the vehicle between the front bumper and the back bumper. The front and rear axles are mounted on the frame. The engine and transmission are mounted on the frame. The vehicle body is married to the frame and includes a bulkhead that separates the occupant compartment from the engine compartment. The fenders are then mounted on the frame and the bulkhead to surround the engine.

Other motor vehicles have the frame and the body integrated together into a single one-piece structure that is comprised of a large number of parts that are welded together so that the front fenders, radiator support, and bulkhead are joined together as a unit. In this way, the one-piece body and frame unit defines both the engine compartment and the passenger compartment. This type of body construction is commonly referred to as a unibody construction, or an integral frame and body construction. In this unibody construction, the engine is mounted on an engine cradle, and then the engine cradle is bolted to the underside of the unibody construction. In the unibody construction, the entire single piece structure performs as a load-carrying member that reacts to all loads experienced by the vehicle, including road loads, cargo loads and impact loads. It would be desirable to provide alternative vehicle constructions that would provide new and different management of impact loads in which loads that would otherwise be transferred into the unibody are, instead, transferred into the cradle.

SUMMARY OF THE INVENTION

A cradle for mounting an engine in a vehicle has left and right side members, and a rear cross member and front cross member extending between the left and right side members. The cradle has left and right front body mounts. Left and right deflector devices are mounted respectively on the cradle adjacent the left and right body mounts and forwardly of the vehicle wheels. Each of the left and right deflector devices including an impact receiving member that projects outwardly from the cradle to receive an impact load offset outboard from the body mounts. Each impact receiving member has an upper and lower sheet metal shell providing a top wall welded to a top wall of the cradle and a bottom wall welded to the bottom wall of the cradle, and a front impact receiving wall extending vertically between the top wall and the bottom wall.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 3 is an exploded perspective view of the deflector device of FIG. 2.

FIG. 4 shows a sheet metal blank for forming a deflector device.

FIG. 5 is a persepective view of the deflector device formed of the sheet metal blank of FIG. 4.

FIG. 6 is an exploded perspective view of another embodiment of the deflector device.

FIG. 7 is a perspective view of another embodiment of the deflector device.

FIG. 8 is a perspective view of another embodiment of the deflector device.

FIG. 9 is a perspective view of another embodiment of the deflector device, having parts broken away and in section.

DETAILED DESCRIPTION OF THE EXEMPLARY EMBODIMENTS

The following description of certain exemplary embodiments is merely exemplary in nature and is not intended to limit the invention, its application, or uses.

Figure 1:
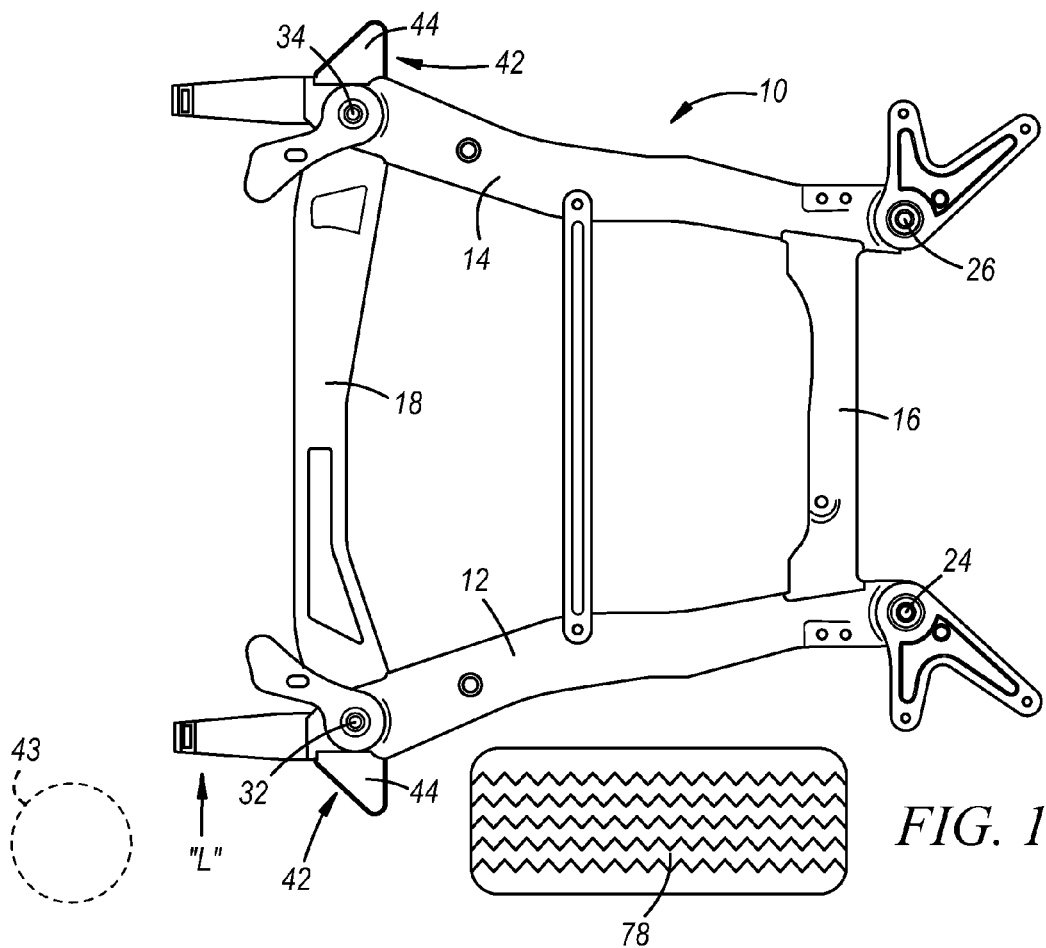
FIG. 1 is a plan view of an engine cradle having a deflector device of this invention.

Referring to FIG. 1, an engine cradle, generally indicated at 10, for a motor vehicle includes a left side member 12, a right side member 14, a rear cross member 16, and a front cross member 18. The left side member 12 and right side member 14 are laterally spaced apart and connected at their rear ends to the rear cross member 16 by bolts or welds. A vehicle body mount 24 is mounted at the rear end of the left side member 12 and a body mount 26 is mounted at the rear end of the right side member 14. The left side member 12 and right side member 14 are connected together at their front ends to the front cross member 18 by bolts or welds. As seen in FIG. 1, a body mount 32 is provided on the front of the cradle 10 adjacent the juncture of the front cross member 18 and the left side rail 12. Likewise, a body mount 34 is provided on the front cradle 10 adjacent the juncture of the front cross member 18 and the right side rail 14.

During assembly of the motor vehicle, a vehicle engine and transmission will be mounted on the cradle 10. In addition, the suspensions for the left and right front wheels will be mounted on the cradle 10. Then, the cradle 10 will be married onto the underbody of an integral frame and body structure by the body mounts 24, 26, 32, and 34.

Figure 2:
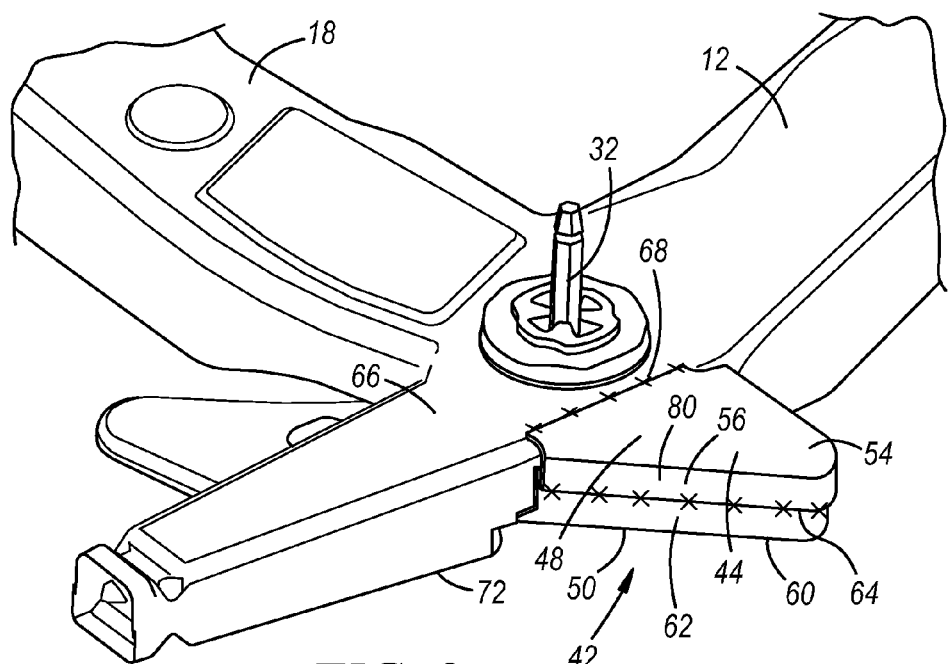
FIG. 2 is an enlarged perspective view of the deflector device of FIG. 1.

Referring to FIGS. 1 and 2, a deflector device, generally indicated at 42, is provided on each side of the cradle 10 for modifying the performance of the motor vehicle in the event of an impact with a pole 43. As seen in FIGS. 1 and 2, each of the left and right deflector devices 42 includes an impact receiving member 44 that projects outwardly from the cradle 10 to receive an impact load from a pole 43 that is offset outboard from the body mounts 32 and 34.

Referring to FIGS. 2 and 3, the left hand impact receiving member 44 includes an upper shell 48 and a lower shell 50. The upper shell 48 and lower shell 50 are stamped from heavy gauge metal sheet. The upper shell 48 has a top wall 54 and a depending flange 56. The lower shell 50 has a bottom wall 60 and an upstanding flange 62. The depending flange 56 and the upstanding flange 62 overlap one another and are welded together by welds 64. The top wall of upper shell 48 extends onto the top surface 66 of the left side member 12 and is welded thereto by welds 68. The bottom wall 60 of lower shell 50 extends onto the bottom surface 72 of the left side member 12 and is welded thereto by welds, not shown in the drawing. As seen in FIGS. 1 and 3, the overlapped and welded together depending flange 56 and upstanding flange 62 cooperate to form an impacting receiving wall 80 that angles outwardly and rearwardly from the side member 12. The overlapping of the depending flange 56 and upstanding flange 62 provide a double thickness of metal to provide high strength for receiving the impact of the pole 43. The gauge of the sheet metal and the extent of the overlap will be chosen to provide the desired strength It will be understood that the impact receiving member 44 can be preassembled by first welding together the upper shell 48 and lower shell 50, and then thereafter welding the top wall 54 to the top surface 66 of the side member 12 and welding the bottom wall 70 to the bottom surface 72 of the side member 12. Alternatively the upper shell 48 and lower shell 50 can be respectively welded to the top surface 66 and bottom surface 72, and then thereafter the depending flange 56 and upstanding flange 62 can be welded together.

In the event of experiencing the pole 43 during forward travel of the vehicle, the impact receiving member 44 will engage the pole 43 and receive the load and impose the load laterally on the cradle 10 in the direction of the arrow L of FIG. 1. This lateral load can induce the vehicle to slide away laterally from the pole 43. In addition, the impact receiving member 44 will receive the impact load that would otherwise transfer into the vehicle wheel 78 and other vehicle structures that lie outboard of the side member 12.

FIGS. 4 and 5 shows an alternate construction of the impact receiving member. An impact receiving member 81 in which a one-piece stamping includes integrally connected portions forming the upper and lower shells that will be folded to provide a top wall 82 and a bottom wall 84 connected together by an integral flange portion 86 that will provide the impact receiving wall 88. In FIG. 4 the one-piece stamping is shown in its flat condition prior to being bent about fold lines at 90 and 92. Upon bending about the fold lines 90 and 92, the impact receiving member will assume the shape similar to that of FIG. 2 so that the top wall 82 can be welded to the top surface 66 of the side member 12 and the bottom wall 84 can be welded to the bottom surface 72 of the side member 12. FIG. 5 shows the impact receiving member of FIG. 4 in its installed position having been welded to the side member 12 of the cradle 10. Although the impact receiving wall 88 is of only a single thickness of metal, the integral construction can also provide a high strength impact receiving wall.

FIG. 6 shows another alternate construction for the impact receiving member. The impact receiving member 98 is generally similar to that of FIG. 3. Upper shell 100 has a top wall 102 and a depending flange 104. Lower shell 106 has a bottom wall 108 and an upstanding flange 110. The depending flange 104 and upstanding flange 110 will overlap and be welded together to provide the impact receiving surface 114. The impact receiving member of FIG. 6 includes a rear reinforcing wall 112. This rear reinforcing wall 112 is provided by a rear downward depending flange 116 that depends downwardly from the top wall 102 of the upper shell 100 and a rear upstanding flange 118 that extends upwardly from the bottom wall 108 of the lower shell 106. The rear downward depending flange 116 and the rear upstanding flange 118 will overlap and be welded together, providing in effect a transverse extending reinforcement that lends additional impact receiving strength to the impact receiving member and extends generally perpendicular to the side member 12 of cradle 10. In addition, as shown in FIG. 6, the downwardly depending flanges 104 and 116 of the upper shell 100 are preferably integrally connected together as shown at outer corner 122, thereby adding strength to the impact receiving member 98. In addition, the upstanding flanges 110 and 118 are preferably integrally formed and connect together as shown at the outer corner 124, thereby adding additional strength to the impact receiving member 98. The FIGS. 7, 8 and 9 show alternative shapes for the impact receiving member 44. In the embodiment of FIGS. 2 and 5, the front impact receiving walls were generally straight line, extending outwardly and rearwardly from the side member 12 of the cradle 10.

FIG. 7 has an impact receiving member 130 comprised of upper shell 132 and lower shell 134. Upper shell 132 has a downward depending flange 138 that overlaps with an upstanding flange 140 of the lower shell 134. As seen in FIG. 7 the flanges 138 and 140 are each rearwardly convex in shape and accordingly cooperate to define a front impact receiving wall 144 that is rearwardly convex in shape as the front impact reveiving wall 144 extends outwardly and rearwardly from the side member 12 of the cradle 10.

FIG. 8 has an impact receiving member 150 comprised upper shell 152 and lower shell 154. Upper shell 152 has a downward depending flange 158 that overlaps with an upstanding flange 160 of the lower shell 154. As seen in FIG. 8 the flanges 158 and 160 are each rearwardly concave in shape and accordingly cooperate to define a front impact receiving wall 164 that is rearwardly concave in shape as the front impact receiving wall 164 extends outwardly and rearwardly from the side member 12 of the cradle 10.

FIG. 9 has an impact receiving member 170 comprised of upper shell 172 and lower shell 174. Upper shell 172 has a downward depending flange 178 that overlaps with an upstanding flange 180 of the lower shell 174. As seen in FIG. 8 the flanges 178 and 180 are each straight line in shape and accordingly cooperate to define a front impact receiving wall 184 that is straight line in shape. In addition the upper shell 172 has a rear downward depending flange 188 that overlaps with upstanding flange 190 of the lower shell 174. As seen in FIG. 9, the flanges 188 and 190 are angled rearwardly from an outboard corner 192 of the impact receiving member 170 so as to provide a rear reinforcing wall 194 that angles rearwardly from the outboard corner 192 toward the cradle 10.

Thus upon consideration of the various embodiments herein is seen that the front impact receiving wall of the impact receiving member can be either straight line in shape, concave in shape, or convex in shape. In addition, the impact receiving member can have an additional rear reinforcing wall that extends in a straight line transverse to the cradle or in a rearwardly angled line from an outboard corner to the cradle.

Thus, it is seen that the invention provides a path for transference of impact loads into the engine cradle rather than into the vehicle wheel and other vehicle structures that lie generally outboard of the longitudinal extending side member of the engine cradle.

What is claimed is:

1. A cradle for mounting an engine in a vehicle having wheels located outboard of the cradle, said cradle comprising:
   left and right side members spaced laterally apart from one another on opposite sides of the engine and inboard of the wheels;

a rear cross member having right and left ends attached respectively to the left and right side members;
a front cross member having left and right ends attached respectively to the left and right side members;
left and right front vehicle body mounts provided on the cradle for bolting together the vehicle body and the cradle;
left and right deflector devices mounted respectively on the cradle adjacent the left and right body mounts and forwardly of the vehicle wheels, each of the left and right deflector devices including an impact receiving member that projects outwardly from the cradle to receive an impact load that is offset outboard from the body mounts, said impact receiving members each having an upper and a lower sheet metal shell providing a top wall welded to a top wall of the cradle and bottom wall welded to the bottom wall of the cradle, and a front impact receiving wall extending vertically between the top wall and the bottom wall and being angled outwardly and rearwardly from the cradle.

2. The cradle of claim 1 further comprising the front impact receiving wall being formed of overlapped portions of the upper and lower shell that are welded together.

3. The cradle of claim 1 further comprising the upper shell having a downwardly depending flange and the lower shell having an upstanding flange, said depending flange and upstanding flange overlapping one another and being welded together to define the front impact receiving wall.

4. The cradle of claim 1 further comprising the upper shell having a downwardly depending rear flange at a rear edge thereof and the lower shell having an upstanding rear flange at the rear edge thereof, said depending rear flange and upstanding rear flange overlapping one another and being welded together to define a rear reinforcing wall that reinforces the impact receiving wall.

5. The cradle of claim 1 further comprising the front impact receiving wall being in a straight line from the cradle to an outboard corner of the upper and lower shells.

6. The cradle of claim 1 further comprising the front impact receiving wall being concave and extending from the cradle to an outboard corner of the upper and lower shells.

7. The cradle of claim 1 further comprising the front impact receiving wall being convex and extending from the cradle to an outboard corner of the upper and lower shells.

8. The cradle of claim 4 further comprising the rear impact receiving wall extending at an angle from the cradle to a rear outboard corner of the upper and lower shells.

9. The cradle of for claim 1 further comprising the upper and lower shells being separately stamped of heavy gauge sheet metal, the upper shell having a downwardly depending flange and the bottom shell having a upstanding flange overlapped with the downwardly depending flange and welded thereto to provide a double thickness impact receiving wall.

10. Cradle of claim 1 further comprising the impact receiving member being formed of a single piece stamping folded to define the upper shell and lower shell including a top wall of the upper shell and bottom wall of the lower shell that are integrally connected to provide the front impact receiving wall.

11. A cradle for mounting an engine in a vehicle having wheels located outboard of the cradle, said cradle comprising:
left and right side members spaced laterally apart from one another on opposite sides of the engine and inboard of the wheels;
a rear cross member having right and left ends attached respectively to the left and right side members;
a front cross member having left and right ends attached respectively to the left and right side members;
left and right front vehicle body mounts provided on the cradle for bolting together the vehicle body and the cradle;
left and right deflector devices mounted respectively on the cradle adjacent the left and right body mounts and forwardly of the vehicle wheels, each of the left and right deflector devices including an impact receiving member that projects outwardly from the cradle to receive an impact load that is offset outboard from the body mounts, said impact receiving members each having an upper and a lower sheet metal shell providing a top wall welded to a top wall of the cradle and bottom wall welded to the bottom wall of the cradle, and a front impact receiving wall extending vertically between the top wall and the bottom wall, said front impact receiving wall being formed by welded together overlapped portions of the upper and lower shells, and a rear reinforcing wall extending vertically between the upper and lower shells rearward of the front impact receiving wall to reinforce the upper and lower sheet metal shells.

12. The cradle of claim 11 further comprising the upper shell having a downwardly depending rear flange at a rear edge thereof and the lower shell having an upstanding rear flange at the rear edge thereof, said depending rear flange and upstanding rear flange overlapping one another and being welded together to form the rear reinforcing wall.

13. The cradle of claim 12 further comprising the rear reinforcing wall extending perpendicularly from a outboard rear corner of the upper and lower shells to the cradle.

14. The cradle of claim 12 further comprising the rear reinforcing wall extending at an angle rearwardly and inwardly from an outboard rear corner of the upper and lower shells to the cradle.

15. The cradle of claim 11 further comprising the front impact receiving wall being in a straight line from the cradle to an outboard corner of the upper and lower shells.

16. The cradle of claim 11 further comprising the front impact receiving wall being concave and extending from the cradle to an outboard corner of the upper and lower shells.

17. The cradle of claim 11 further comprising the front impact receiving wall being convex and extending from the cradle to an outboard corner of the upper and lower shells.

18. The cradle of claim 11 further comprising the rear impact receiving wall extending at an angle from the cradle to a rear outboard corner of the upper and lower shells.

19. The cradle of for claim 11 further comprising the upper and lower shells being separately stamped of heavy gauge sheet metal, the upper shell having a downwardly depending flange and the bottom shell having a upstanding flange overlapped with the downwardly depending flange and welded thereto to provide a double thickness impact receiving face.

20. A cradle for mounting an engine in a vehicle having wheels located outboard of the cradle, said cradle comprising:
left and right side members spaced laterally apart from one another on opposite sides of the engine and inboard of the wheels;
a rear cross member having right and left ends attached respectively to the left and right side members;
a front cross member having left and right ends attached respectively to the left and right side members;
left and right front vehicle body mounts provided on the cradle for bolting together the vehicle body and the cradle;
left and right deflector devices mounted respectively on the cradle adjacent the left and right body mounts and forwardly of the vehicle wheels, each of the left and right deflector devices including an impact receiving member that projects outwardly from the cradle to receive an impact load that is offset outboard from the body mounts, said impact receiving members each having an upper and a lower sheet metal shell providing a top wall welded to a top wall of the cradle and bottom wall welded to the bottom wall of the cradle, and a front impact receiving wall extending vertically between the top wall and the bottom wall, said impact receiving member being formed of a single piece stamping folded to define the upper shell and lower shell including a top wall of the upper shell and bottom wall of the lower shell that are integrally connected to provide the front impact receiving wall.

* * * * *